(12) United States Patent
Lee (10) Patent No.: US 7,689,719 B2
(45) Date of Patent: *Mar. 30, 2010

(54) MESSAGING PROTOCOL FOR PROCESSING MESSAGES WITH ATTACHMENTS

(75) Inventor: Jacob J. Lee, Marina del Rey, CA (US)

(73) Assignee: j2 Global Communications, Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/196,638

(22) Filed: Aug. 22, 2008

(65) Prior Publication Data

US 2008/0313295 A1 Dec. 18, 2008

Related U.S. Application Data (63) Continuation of application No. 10/851,311, filed on May 21, 2004, now Pat. No. 7,421,514.

(51) Int. Cl.
*G06F 15/16* (2006.01)
*G06F 17/00* (2006.01)

(52) U.S. Cl. .................. 709/246; 709/206; 715/229; 715/230

(58) Field of Classification Search ............... 715/229, 715/230; 709/206, 246
See application file for complete search history.

(56) References Cited

U.S. PATENT DOCUMENTS

| | | | |
|---|---|---|---|
| 6,735,623 | B1 | 5/2004 | Prust |
| 6,920,482 | B1 | 7/2005 | Fujiyoshi |
| 6,931,592 | B1 | 8/2005 | Ramaley et al. |
| 7,107,276 | B2 | 9/2006 | Johnson, Jr. |
| 2002/0059382 | A1 | 5/2002 | Yamaguchi et al. |
| 2003/0028600 | A1 | 2/2003 | Parker |
| 2003/0126136 | A1 | 7/2003 | Omoigui |
| 2004/0064733 | A1 | 4/2004 | Gong |
| 2004/0078375 | A1 | 4/2004 | Johnson, Jr. |
| 2005/0044492 | A1 | 2/2005 | Ramaley et al. |

FOREIGN PATENT DOCUMENTS

| | | |
|---|---|---|
| GB | 2347581 A | 9/2000 |
| JP | 2003032309 A | 1/2003 |

OTHER PUBLICATIONS

European Search Report, dated Nov. 8, 2007, European Patent Application No. 05752129.6 (based on PCT Application No. PCT/US2005/017613), Applicant/Proprietor, j2 Global Communications, 3 pages.
Non-Final Office Action, dated Sep. 25, 2006, U.S. Appl. No. 10/851,311, filed May 21, 2004, First Named Inventor: Jacob J. Lee, 13 pages.

(Continued)

*Primary Examiner*—Paul H Kang
(74) *Attorney, Agent, or Firm*—Blakely, Sokoloff, Taylor & Zafman, LLP (57) ABSTRACT

A message that is to be processed according to an electronic messaging protocol is associated with a sender of the message. The message also includes an attachment from an attaching entity. The attachment is associated with a unique property of the attaching entity. Other embodiments are also described and claimed.

27 Claims, 6 Drawing Sheets

OTHER PUBLICATIONS

Final Office Action, dated Jan. 31, 2007 U.S. Appl. No. 10/851,311, filed May 21, 2004, First Named Inventor: Jacob J. Lee, 14 pages.

Non-Final Office Action, dated Sep. 11, 2007, U.S. Appl. No. 10/851,311, filed May 21, 2004, First Named Inventor: Jacob J. Lee, 12 pages.

RFC 2183, "Communicating Presentation Information in Internet Messages: The Content-Disposition Header Field", R. Troost, S. Dorner, K. Moore, Ed., Aug. 1997, 13 pages.

"Inserting Fields into E-mail Messages", Nov. 9, 2006, Internet search: http://www.shopping.netsuite.com/s.nl/c.NLCORP/ctype.KB/it.1/id.33812, 1 page.

Loshin, Peter, "Essential Email Standards", RFCs and Protocols Made Practical, Internet Standards Series, John Wiley & Sons, Inc., Copyright 2000 (pp. iii-xi; Chapter 7—Messaging Standards pp. 71-80; pp. 85-97; and Chapter 9—Multipurpose Internet Mail Extensions (MIME) pp. 113-142.

Schultz, Matthew G., "Monitoring the Propagation of Email Attachments", May 1, 2001, Internet search: http://vvww.sagecertification.org/publications/library/proceedings/usen, 1 page.

This message is not flagged. [Flag Message - Mark as Unread]
From: Margaux_Rodriguez@bstz.com  📇 Add to Address Book
Subject: 📎 example email message  ⬅ 10
To: zangoli@yaoo.com  ⬅ 14
CC: Farzad_Amini@bstz.com
Date: Thu, 5 Feb 2004 14:48:58 -0800

— — — Forwarded by Margaux Rodriguez/bstzsecure on 02/05/04 02:49 PM — — —

| | | |
|---|---|---|
| Margaux Rodriguez Sent by: Margaux | To: cc: Subject: | zangonli@yahoo.com example email |

Thought this might also be of interest to you.....

(See attached file: PETE's Fest)

— — — Forwarded by Margaux Rodriguez/bstzsecure on 02/05/04 02:30 PM — — —

| | | |
|---|---|---|
| | Farzad Amini ⬅ 18 | ⬅ 22 |
| 02/05/04 02:14 PM | To: cc: Subject: | Margaux Rodriguez/bstzsecure@BSTZ example email message |

Margaux,
Please forward this email message to:    zangonli@yahoo.com
Add a small attachment and some text to the message body.
thanks,
-Farzad
(See attached file: breadpudding)

| Attachment | |
|---|---|
| PETE_s_Fest ⬅ 26 file ⬅ 30 [margaux_rodriguez@bstz.com] | Download File |

| Attachment | |
|---|---|
| breadpudding ⬅ 34 file ⬅ 38 [farzad_amini@bstz.com] | Download File |

FIG. 7 eFaxSecure

Home | Downloads | Customer Support | My Account | Help

User: Jacob Lee
Number: 13092182920
☒ Log Out  ~822

Secure Inbox
- ▲ Message Inbox
- ▲ Preferences
- ▲ Manage Folders
- ▲ Customer Support
  826

Storage Details
Messages 6
Total Storage 10 mb
Available Storage 7.88 mb
  828

Messages Inbox

Folders | Message
--- | ---
Inbox | To      Jeff.Adelman@j2global.com
Alpha | From    Jacob Lee (jacob.lee@j2global.com)
Beta | Date    Yesterday, 04/20/2004 15:15:21, PDT7
Delta | Subject FW: Project Danube - Requirements Documents...
Gamma | Attachment: ▲ 📄 j2GlobalComm_P021_firstdr.doc (23KB),
Zeta |   808↗  📄 Voice Script1_he.doc (27KB)
☒ Create a new folder |   804↗  📄 Voice Script Hebrew.PDF (26KB):

824

Please take a look at these requirements and provide any feedback you may have.

| File Name | Attached | Date |
| --- | --- | --- |
| j2GlobalComm_P021_firstdr.doc(23KB) | Farzad Amini | 04/08/2004 |
| Voice Script1_he.doc (27KB) | Jacob Lee | 04/16/2004 |
| Voice Script Hebrew.PDF (26KB) | Jacob Lee | 04/16/2004 |

812↗

MOVE TO  | (Select a Folder) ▼ |

Delete message

FIG. 8 eFaxSecure

User: Jacob Lee
Number: 13092182920
☒ Log Out

Home | Downloads | Customer Support | My Account | Help

Messages Inbox

Secure Inbox
- ▲ Message Inbox
- ▲ Preferences
- ▲ Manage Folders
- ▲ Customer Support Storage Details
  Messages  6
  Total Storage  10 mb
  Available Storage  7.88 mb

Folders  Message
Inbox
Alpha    To    Jeff.Adelman@j2global.com
Beta    From    Jacob Lee (jacob.lee@j2global.com)
Delta    Date    Yesterday, 04/20/2004 15:15:21, PDT7
Gamma    Subject    FW: Project Danube - Requirements Documents...
Zeta    Attachement: ▶   🗎 j2GlobalComm_P021_firstdr.doc (23KB, Jacob Lee,
    808      Farzad Amini, 04/08/2004),
☒ Create a new folder    🗎 Voice Script1_he.doc (102KB, Jacob Lee, 04/16/2004)
        🗎 Voice Script Hebrew.PDF (226KB, Jacob Lee, 04/16/2004)

↳ 804

Please take a look at these requirements and provide
any feedback you may have.

↰ 812

| File Name | Attached | Date |
|---|---|---|
| j2GlobalComm_P021_firstdr.doc(23KB) | Farzad Amini | 04/08/2004 |
| Voice Script1_he.doc (27KB) | Jacob Lee | 04/16/2004 |
| Voice Script Hebrew.PDF (26KB) | Jacob Lee | 04/16/2004 |

Delete message    MOVE TO    (Select a Folder) ▶

FIG. 9

MESSAGING PROTOCOL FOR PROCESSING MESSAGES WITH ATTACHMENTS

This application is a continuation of U.S. application Ser. No. 10/851,311, filed May 21, 2004, now U.S. Pat. No. 7,421,514 entitled "Messaging Protocol for Processing Messages with Attachments".

BACKGROUND

An embodiment of the invention is related to electronic messaging protocols for a set of data networks that are interconnected with routers (e.g., the Internet), and in particular to the processing of messages having attachments. Other embodiments are also described and claimed.

Electronic messaging protocols such as those that are used to pass messages over the Internet are in widespread use. Examples of such protocols include electronic mail (email), news, and online-chat (sometimes referred to as Instant Messaging) protocols. These protocols typically define a message as some form of data structure that has (i) a message body and (ii) one or more header fields. The header fields may contain information about where the message came from (e.g., the "from:" field of an email message), where it is going (e.g., the "to:" field of an email message), its subject, when it was sent, etc. The message body on the other hand may contain the body or essence of the message, in the form of data that typically has a predefined format (e.g., consists only of ASCII characters).

Some protocols allow a sender to enclose or "attach" in the message body an object that is not in the predefined format. These protocols can automatically translate between the predefined format and some other format used by a given software application (e.g., between 7-bit ASCII characters and 8-bit binary characters). The attached objects may be "detached" by the recipient of the message, using the translation protocol. For example, with respect to email messages, the Multipurpose Internet Mail Extensions (MIME) protocol allows non-ASCII objects such as image files, audio/video files, and application software files (e.g., word processor, spreadsheet, and database program files) to become attachments in a message. Attachments are represented to a user on a display monitor as, for example, a small icon together with an identifier such as its filename.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

The inventor has noted that when a forwarded message has been received that contains an attachment, conventional techniques do not show or suggest to the recipient of the message who, among the various senders associated with the forwarded message, is the attaching entity. For example with respect to email, when an email message has been received that has been forwarded at least once and that contains an attachment, the recipient has no indication which of the two or more previous senders of the message actually requested that the attachment be inserted. Such information would be useful particularly in situations where a group of people are collaborating on one or more documents using conventional email capabilities to pass different versions of the document as attachments.

According to an embodiment of the invention, an attachment within a message (that is to be processed according to an electronic messaging protocol) is associated with a unique property of the attaching entity. This is, of course, in addition to associating the message with a sender. The method may be applied to multiple attachments, as well as to messages that have been either newly created or have been forwarded more than once, to more easily allow the recipient of the message to determine who attached what to the message. A graphical user interface may then display not only an attachment name for each of the attachments within a message, but also any unique property of the attaching entity (e.g., name, email address, etc.). This could be done for multiple attachments in the message, and one or more different attaching entities within a single or recursive thread of a message chain.

As an example, consider that John Doe creates a message and attaches a file named "a.doc". The message is then sent to Jane Smith, who receives the message and attaches another file named "b.doc". The message is then forwarded to Alice Cooper. When Alice receives and opens the message using, for example, a client program that supports such a methodology, or a Web interface with similar support, Alice would be presented with not only a message with two attachments in a conventional sense, but will also be presented with the name or other unique property of the person that is directly associated with each attachment. Thus, in this example, Alice would see an attachment icon for a.doc, next which "John Doe" would be displayed. In addition, Alice would see an attachment icon for b.doc, next to which "Jane Smith" is shown. See FIG. 1 for a further example, where a screen shot of a window from a client program acting as a Web interface to an email box enhanced with the "associated attachment" feature is shown. In this example, the display shows a "from" field 10 and a "to" field 14 for the most recent leg of a forwarded message. In addition, an earlier leg is also shown with "from" field 18 and "to" field 22. At the bottom of the screen are two attachments that can be identified by their filename fields 26, 34. Each of these is an "associated attachment" in that an additional field 30, 38 has been added to more easily indicate to the email recipient the attaching entity. More generally, however, as described below, the associated attachment technique may be applied to other types of messaging protocols, as well as other types of data communication networks.

Figure 2:
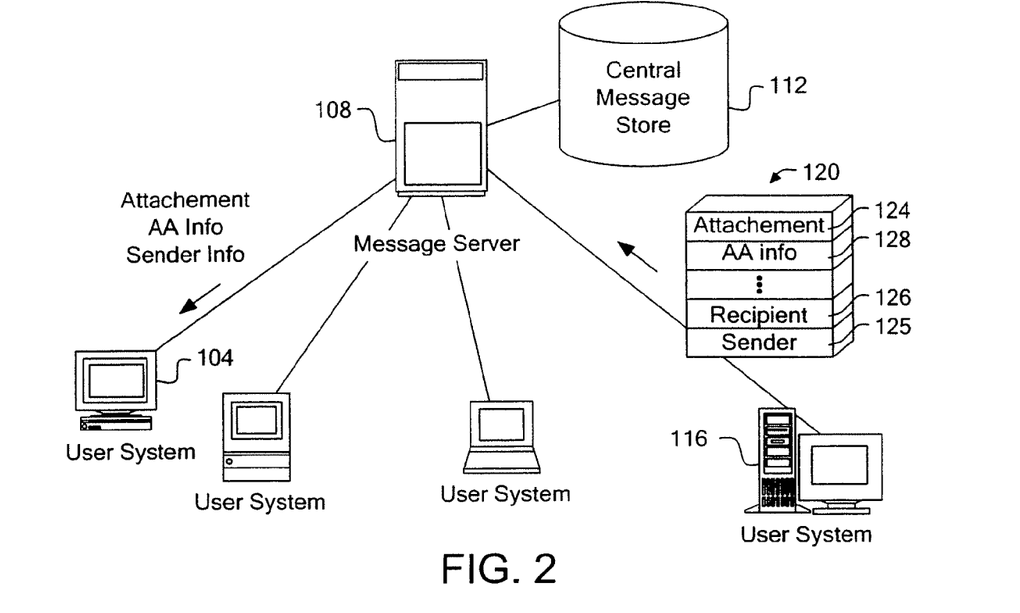
FIG. 2 shows a conceptual diagram of a central server messaging system in which an embodiment of a messaging protocol described here may be implemented.

Turning now to FIG. 2, an example data network for implementing the associated attachment capability is shown. In this example, the messaging protocol uses a single message server 108 in a central server model to pass messages between a number of connected user systems. An example message 120 originates with user system 116 (source) and is to be delivered to the intended recipient at user system 104. The message 120 may be stored within a central message store 112 under control of the message server 108, until a client program in the user system 104 is available to read the message. The message 120 includes an attachment 124 that may have been inserted at the user system 116, a sender field 125 which is filled with data that identifies the sender, a recipient field 126 that identifies the recipient and an associated attachment (AA) field 128 that identifies the entity that requested that the attachment 124 be inserted. The message 120 so created is then stored within the central message store 112 on behalf of the recipient identified in the recipient field 126.

Figure 3:
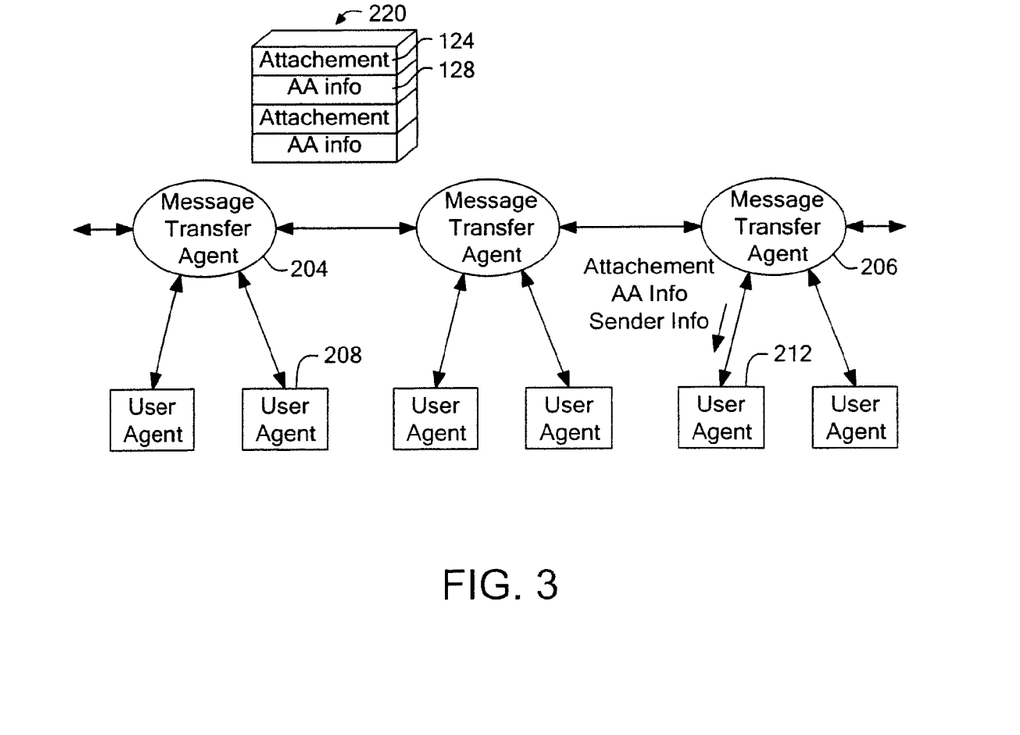
FIG. 3 shows a conceptual diagram of another environment for the messaging protocol in which message transfer agents and user agents are used.

Referring now to FIG. 3, another embodiment of the invention is shown where the messaging protocol operates over multiple networks that are interconnected with one or more routers (e.g., the Internet). Here, rather than having a single message server 108 that serves all of the users in the system, multiple systems or networks are connected with message transfer agents 204. In this case, a message 220 may originate with a user agent 208 and will include one or more attachments 124 together with their AA fields 128 as shown. The message 220 may be stored somewhere along the path between the source user agent 208 and the destination user agent 212. Accordingly, there may be multiple "hops" between the source user agent 208 and the destination user agent 212. As in the embodiment of FIG. 2, the intended recipient will receive information about a message that has been processed according to an electronic messaging protocol, where the message includes an attachment from an attaching entity, a field to identify a sender of the message, and an AA field to identify the attaching entity. This information may be taken from the different portions of the message 220 and may be delivered either in one transfer or in separate transfers, to the recipient at the user agent 212.

Still referring to FIG. 3, the movement of messages from one system to another, that is from one message transfer agent 204 to another, may be implemented using server software that collects messages from a user agent 208 and passes them along to a destination message transfer agent 206. As an example, the Simple Mail Transfer Protocol (SMTP) may be used to define how a message is moved from one store or a file system to another, or from one server to another.

A message may be sent from a user agent 208 to the server in message transfer agent 204, or from the server in message transfer agent 206 to the user agent 212, using for example the Post Office Protocol (POP). In such a case, client software (or the user agent) for the recipient checks the recipient's email box or message store every so often, to see if any messages are there. If so, the message is downloaded and stored locally to be subsequently presented to the recipient. Similarly, at the source or sender site, it is client software or user agent 208 that sends a message to a server in the message transfer agent 204 for delivery.

Figure 4:
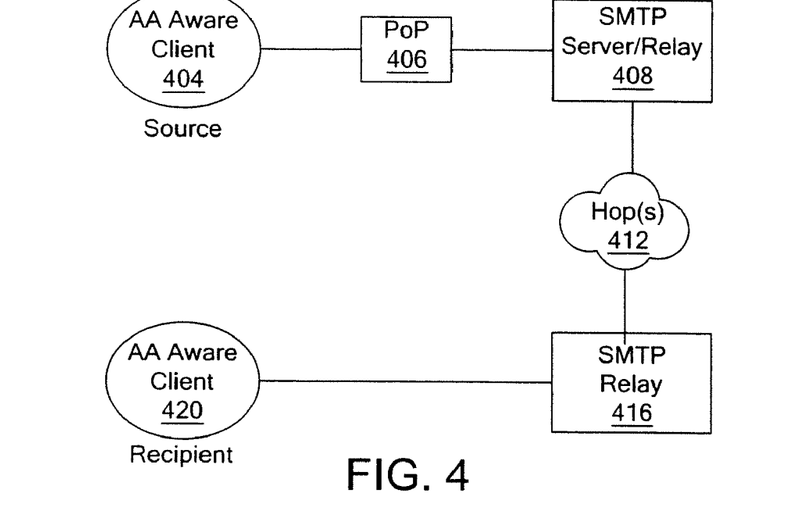
FIG. 4 is a conceptual diagram of communications between the source and the recipient in which the client programs are aware of the associated attachment capability.

FIG. 4 is a conceptual diagram of communications between the source and the recipient in which the client programs (or simply, clients) 404, 420 are aware of the associated attachment capability. In this embodiment, a source client 404 is referred to as being "AA aware" because it can not only insert an attachment into a message that is to be sent, but it also has knowledge of and is able to insert and fill a new field of the message, to identify the user of the source client 404 as the entity who requested that the attachment be inserted.

Figure 1:
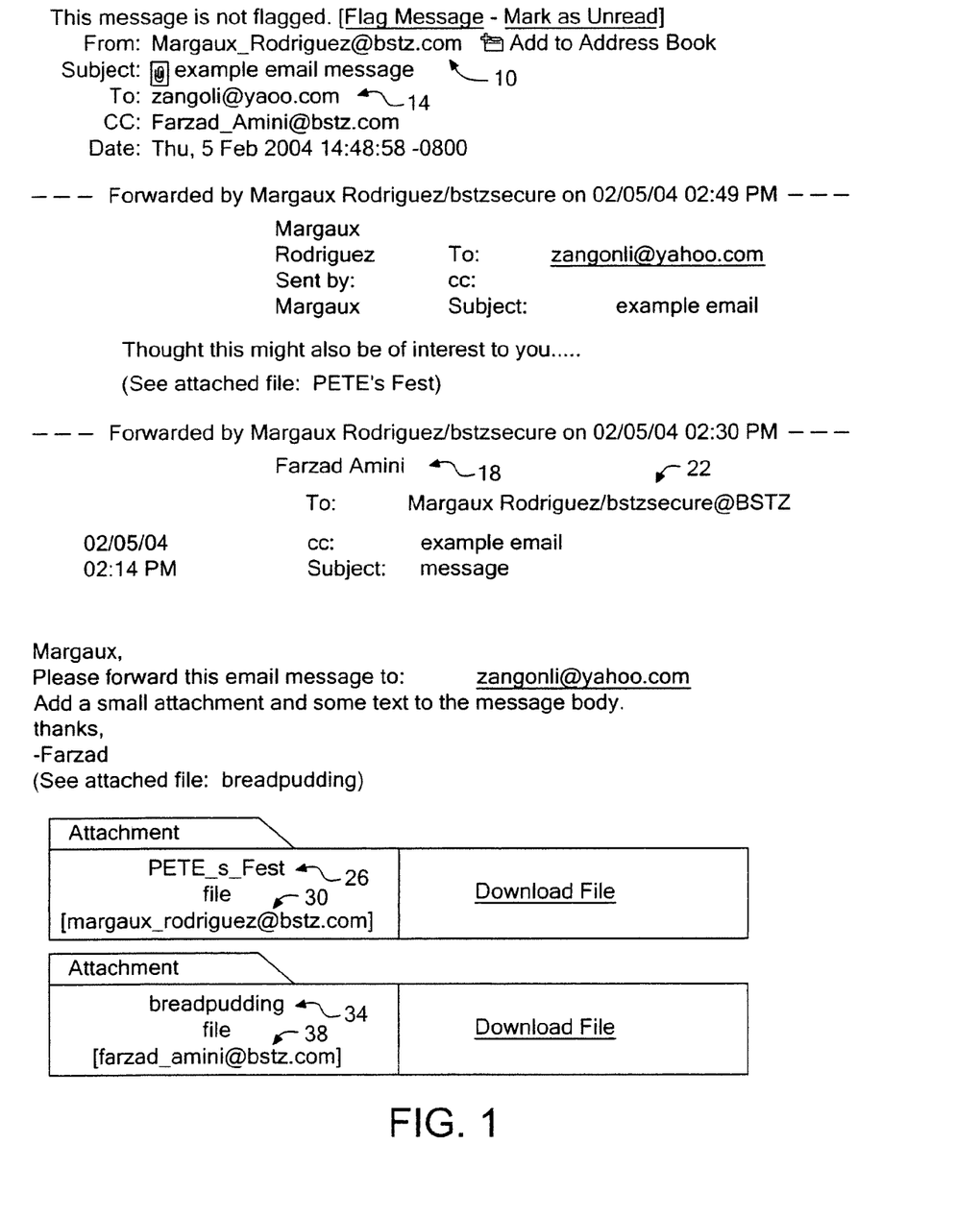
FIG. 1 depicts a screen shot of a received email message with an associated attachment.

Note that this message may be a newly created one, that is newly created in the client 404, or it may be a forwarded message, that is, based on one previously received by the client 404 and that includes information identifying one or more prior senders. In the case of forwarded messages therefore, a further attachment from a prior sender may be included in the message, along with information that separately identifies the prior sender as a further attaching entity that inserted the further attachment. See, for example, the screen shot of FIG. 1 showing such a forwarded message with multiple attachments. Here, the information identifies the attaching entity by its email address; alternatives include the name of the entity and, where the attaching entity is a person, just the initials of the person. Another example of a forwarded message with multiple attachments is shown below, where all headers in the message are also shown.

---

Example Email Message

From Jane Smith Fri Dec 12 15:14:39 2003
X-Apparently-To:    alice@iapdomain..com via 216.136.225.53; Fri, 12 Dec 2003 15:14:58 -0800
Return-Path:    <janes@iapdomain.com>
Received:    from 64.202.166.29 (HELO smtpout-1-2d.secureserver.net) (64.202.166.29) by mta222.mail.scd.yahoo.com with SMTP; Fri, 12 Dec 2003 15:14:57 -0800
Received:    (qmail 16195 invoked from network); 12 Dec 2003 23:14:58 -0000
Received:    from unknown (67.100.80.253) by smtpout-1-2d.secureserver.net (64.202.166.28) with ESMTP; 12 Dec 2003 23:14:58 -0000
Subject:    FW: Pics
Date:    Fri, 12 Dec 2003 15:14:39 -0800
Message-ID:    <002201c3c105$b84012f0$3201a8c0@Mike>
MIME-Version:    1.0
Content-Type: multipart/mixed; boundary="----=_NextPart_000_0023_01C3C0C2.AA1CD2F0"
X-Priority:    3 (Normal)
X-MSMail-Priority:    Normal
X-Mailer:    Microsoft Outlook, Build 10.0.2616
X-MimeOLE:    Produced By Microsoft MimeOLE V6.00.2800.1165

-continued

Example Email Message

Importance:    Normal
Content-Length:    434890
    Forwarded Message
From:    "John Doe" <johnd@iapdomain.com>
To:    janes@iapdomain.com
Subject:    Pics
Date:    Thu, 11 Dec 2003 08:21:36 -0800
Message-ID:    <39A8F53E4B5F714EB75663F972770BDA08CC92@fnserver.doe.local>
MIME-Version:    1.0
Content-Type: multipart/mixed; boundary="----
=_NextPart_000_001D_01C3C0C2.A9F91E50"
X-Priority:    3 (Normal)
X-MSMail-Priority:    Normal
X-Mailer:    Microsoft Outlook, Build 10.0.4510
X-Nonspam:    Whitelist
X-MimeOLE:    Produced By Microsoft MimeOLE V6.00.2800.1165
Importance:    Normal
    Attachment
a.doc
.jpg file, 750×563, 63k
X-AA_entity: "John Doe" <johnd@iapdomain.com>
    Attachment
b.doc
.jpg file, 800×600, 66k
X-AA_entity: "Jane Smith" <janes@iapdomain.com>

In the example above, the information on the attaching entity associated with a particular attachment is given in an "X-header" field, described as X_AA_entity. Other optional message fields may be used, e.g. those that comply with a known messaging standard.

Still referring to FIG. 4, the message may be sent from the source client 404 to a message transfer agent which in this embodiment is a SMTP server/relay 408. This can be done by way of a point of presence (PoP) 406 which gives the user access to the Internet and may be administered by a commercial Internet access provider (IAP). The source user may be a subscriber to the IAP and uses hardware (not shown) that, for example, may communicate with the PoP 406 via a dial-up connection, digital subscriber line (DSL) or other low level transmission link.

The message is further transferred over one or more hops, i.e. nodes of an internet, before arriving at a recipient side mail transfer agent, here the SMTP relay 416. At the SMTP relay 416, the message may be transferred to a storage (not shown) and stored on behalf of the recipient. A recipient client program (or simply, client) 420 may then receive the message (e.g., by polling for new messages) from, for example, an email box assigned to the recipient.

Note that in the embodiment depicted in FIG. 4, both the source and recipient clients 404, 420 are aware of the associated attachment capability. In that case, neither the SMTP server/relay 408 nor the SMTP relay 416 need be aware of the AA capability; it is up to the clients 404, 420 to process and display information about the attaching entity. An example of the clients 404, 420 that may be modified to have the AA capability is an email client program (e.g., NOTES software by Lotus Development Corp.).

Figure 5:
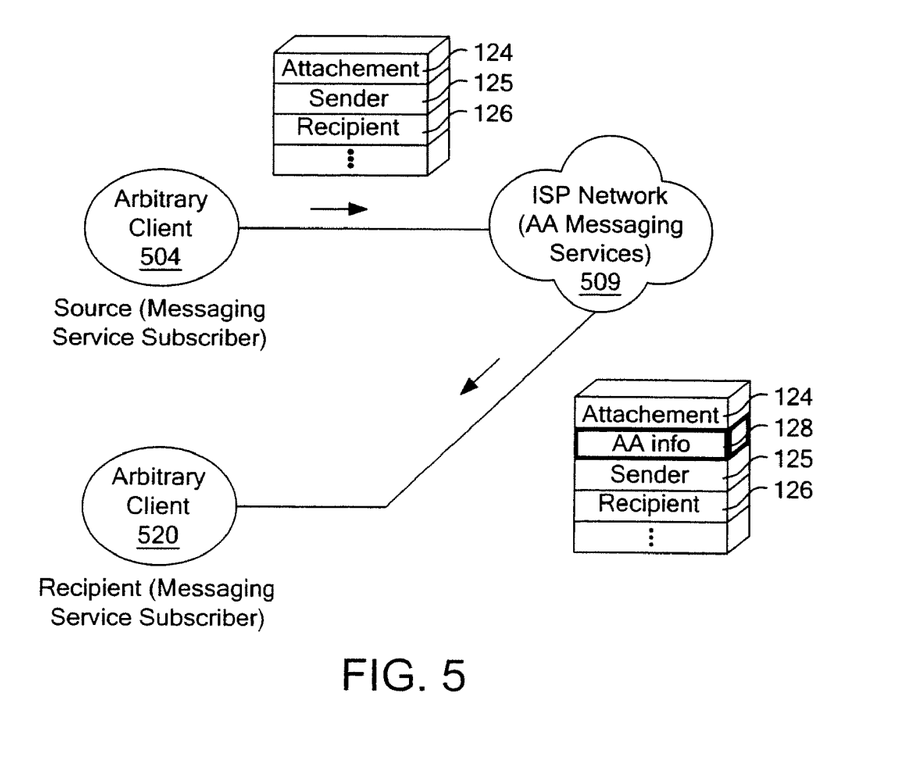
FIG. 5 depicts a conceptual diagram of communications between the source and the recipient where the client programs may be arbitrary in that they need not be aware of the associated attachment capability.

To recap part of the discussion above in connection with FIG. 4, the clients 404, 420 were said to be "AA aware" in that each is inherently capable of interpreting a particular header field of a message as referring to an attaching entity associated with an attachment in the message. In other words, the recipient client 420 (as well as the source client 404) have the needed program code (as provided by the publisher of the software that constitutes the client application) to interpret and properly display the associated attachment information to a user. Another embodiment of the invention is shown in FIG. 5, where the client programs are not capable of automatically interpreting the associated attachment information. For example, the arbitrary client 504 may be a conventional Web browser that is used by the source user to access an email box service to which he or she subscribes, e.g., YAHOO! Mail email solutions. The user in this case is a subscriber to a messaging service, and in particular one that provides the associated attachment capability. The user may request that a new message be created, via a Web interface such as that provided by YAHOO! Mail email solutions, and may specify an attachment to be inserted (according to conventional techniques). It is then up to the Internet service provider (ISP) network 509 that is hosting the email solution to recognize that the user has requested a particular attachment, and in response to add a specified field to the message to separately identify the source user as the entity who requested that the attachment be inserted. This modification to the message can be performed by new software in the ISP network 509 that will recognize the "sender" of the message (that will also contain an attachment 124) as also being the attaching entity, and in response will add AA info field 128 to the message.

At the recipient side, an arbitrary client 520 (e.g., once again a Web browser that is used as a Web interface to the recipient user's email account maintained by an Internet service provider such as YAHOO! Mail email solutions) is used to access and display an "inbox". The associated attachment messaging services added to the ISP network 509 are responsible for providing the arbitrary client 520 with the necessary data, so that the client 520 is able to receive information about the message (that includes an attachment), where this received information has been taken from a sender field and an AA info field of the message. For example, this received information may be presented to the intended recipient of the message via Web site content that has been downloaded by the arbitrary client 520.

Note that in the above described embodiments of FIGS. 4 and 5, although both the source and recipient had a similar type of client program (for instance in FIG. 4, both client programs were AA aware, whereas in FIG. 5 neither client program was AA aware), the associated attachment capability may also be implemented in situations where only one of the source and recipient clients is AA aware. In that case, the user that has an arbitrary client (that is, one which is not AA aware) may need to be a subscriber to an AA messaging service so that his arbitrary client can properly display to the user any associated attachment information that may have been inserted into a particular message.

Figure 6:
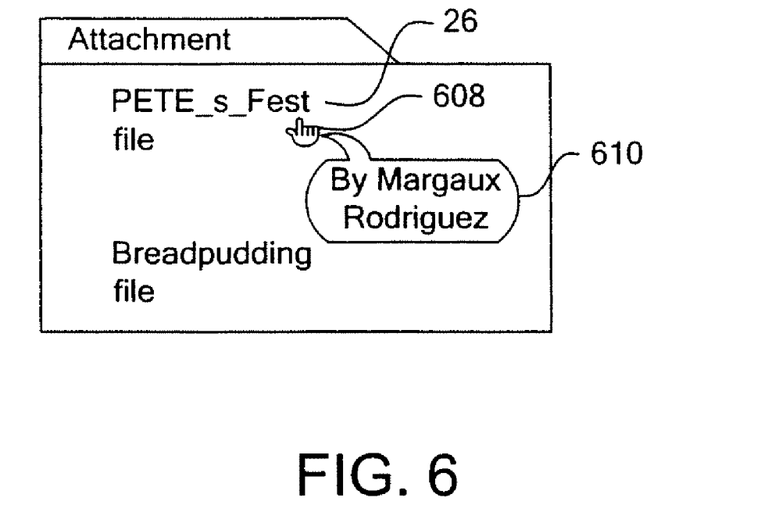
FIG. 6 illustrates a mouse-over feature for displaying information about an associated attachment.
Figure 7:
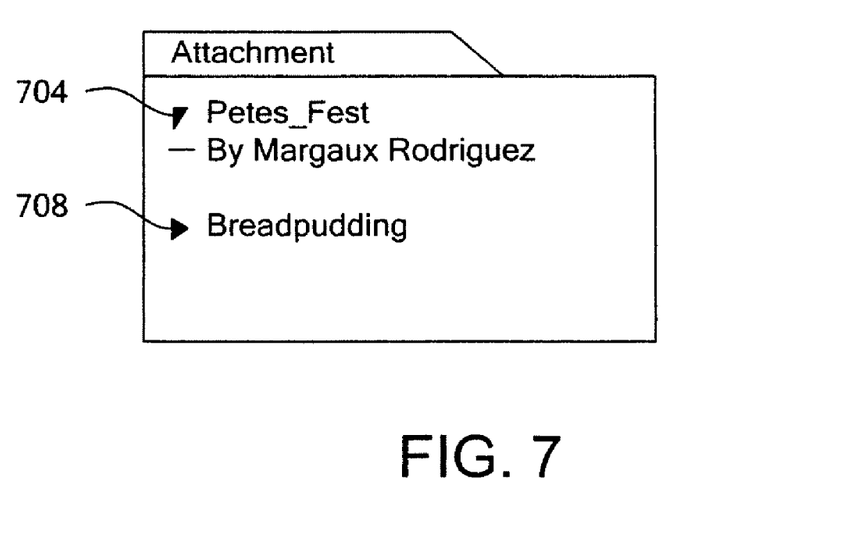
FIG. 7 illustrates a collapse-down/collapse-up feature for displaying information about an associated attachment.

Referring back to FIG. 1, the attaching entity may be identified to a user by for example an email address being continuously displayed to the user, below the filename of the attachment, as shown in FIG. 1. An alternative however is to display this information as a "mouse-over". This is illustrated in FIG. 6. Whenever a cursor 608 is positioned over the displayed filename field 26 of an attachment, a pop-up 610 appears, to identify the attaching entity. The pop-up 610 disappears once the cursor has been moved off the filename field 26. In another embodiment, information about the attaching entity is displayed using a collapse down-collapse up feature as depicted in FIG. 7. Each attachment may be associated with a separate triangular icon 704, 708 that can be clicked-on by the user, to collapse down and collapse up the information about the associated attachments.

Figure 8:
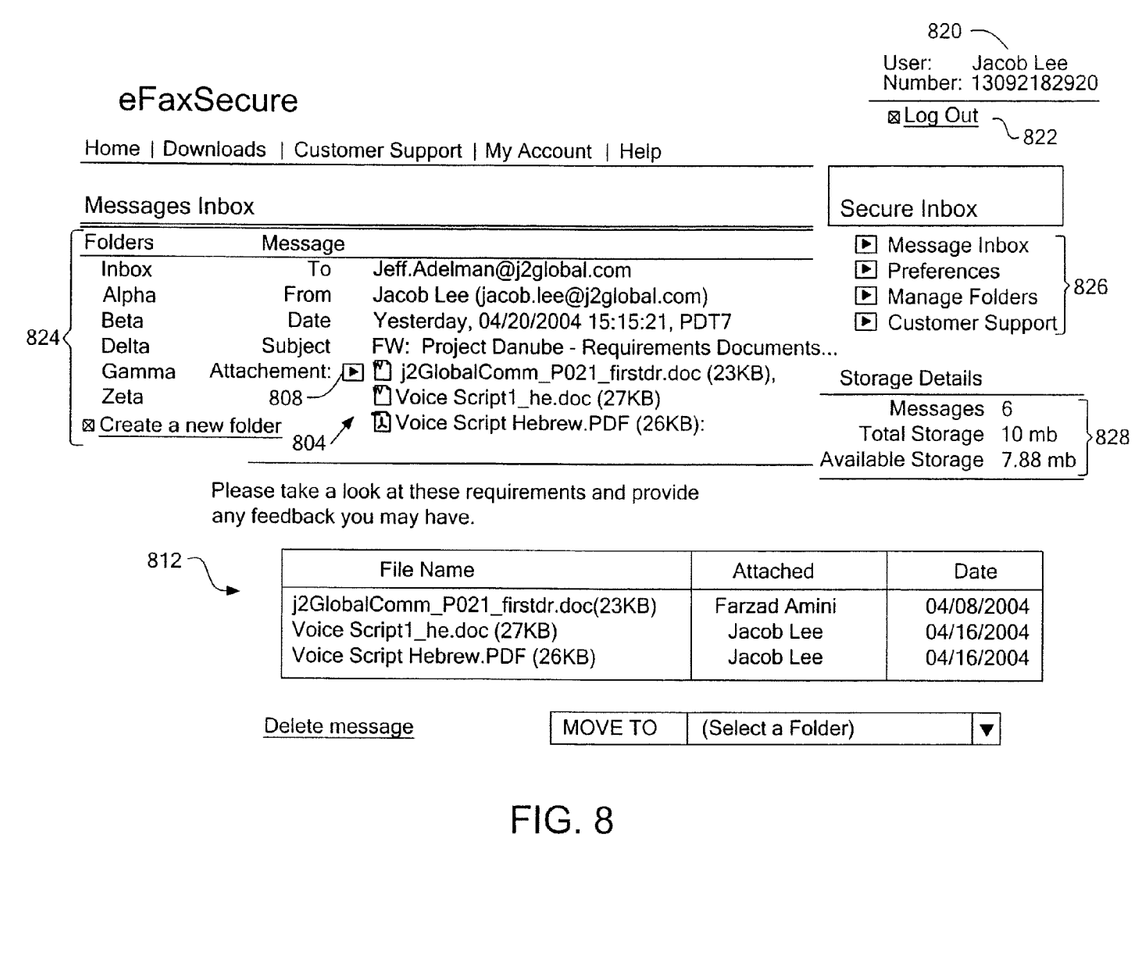
FIG. 8 shows a user interface screen shot that depicts an example default view of a message, with a collapsed attachment section.
Figure 9:
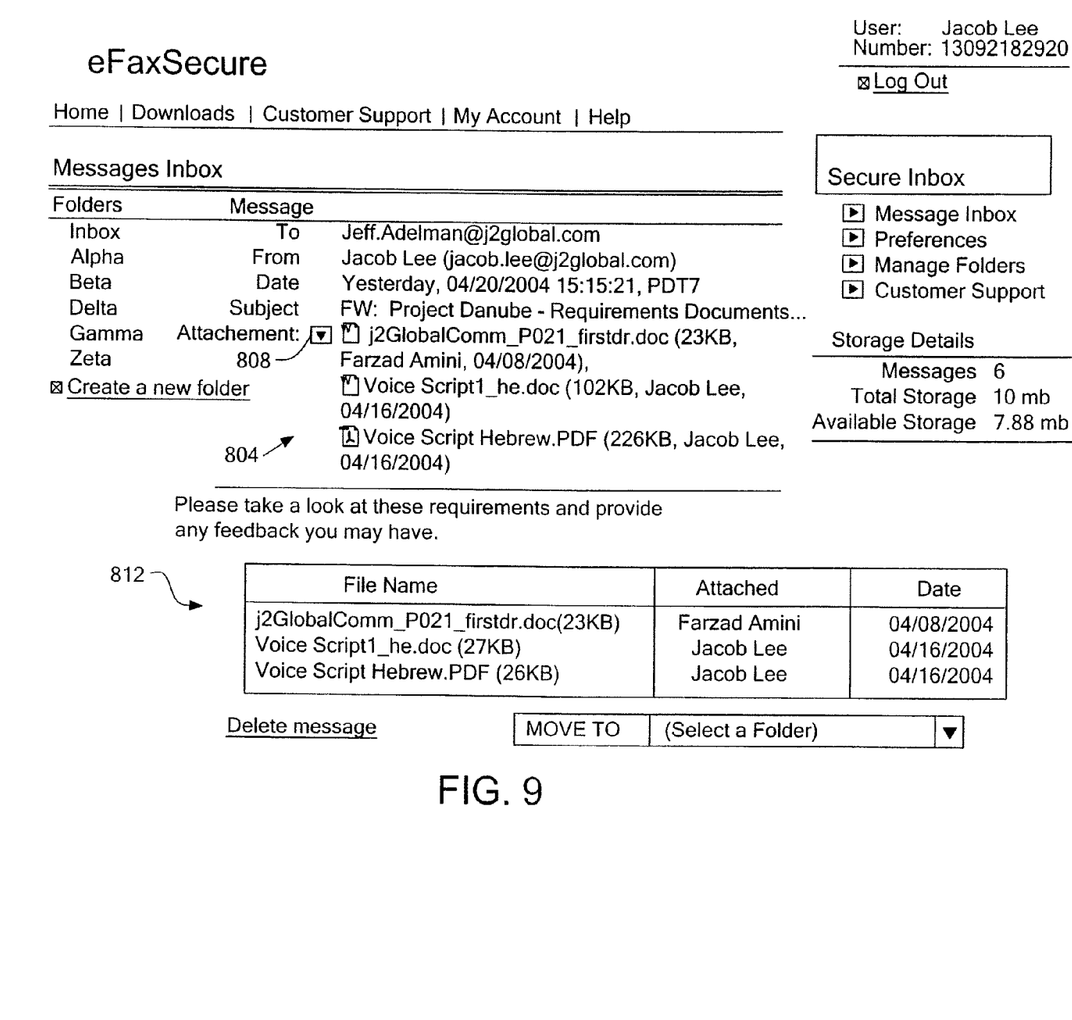
FIG. 9 shows a screen shot of the user interface in FIG. 8 with the attachment section expanded.

FIGS. 8 and 9 show additional examples of displaying a message with associated attachment capability. In FIG. 8, the message is displayed with an attachment section 804 that is collapsed. In this example, there are three attachments as shown. Upon an end user clicking the expand icon 808, an expanded view appears as shown in FIG. 9. Note the additional data that is displayed for each of the three attachments, namely the name of the attaching entity and the date the attachment was created by its author. Alternatively, this additional data may include other types of "meta info" that can be associated with the attaching entity. Not all of this meta info need be displayed, however.

FIGS. 8 and 9 also show another attachment section 812 that may be used instead of the collapsible section 804. In this case, the associated attachment information, e.g. the name of the attaching entity, is automatically displayed next to the name of its respective attachment when the message is opened by the end user, such that there is no need to click to expand the view (as with the section 804).

The user interface in FIGS. 8 and 9 may be a Web-based client that is used to view and manage an email services account of an end user. The service may be one that combines conventional email storage and transmission with the fax/voice-to-email capability offered by j2 Global Communications. The user is identified by name and by an inbound fax/voice number in the section 820. A section 824 displays icons for different folders, one of which is INBOX (highlighted). Higher level actions such as setting preferences of the user interface, managing the folders, customer support, and the message inbox section may be taken using another set of icons in section 826. Finally, storage details regarding the email services account are displayed in section 828.

The embodiments of the invention described above may be provided as a computer program product or software which may include a machine or computer-readable medium having stored thereon instructions which may be used to program a computer (or other electronic devices) to perform a process according to an embodiment of the invention. In other embodiments, operations might be performed by specific hardware components that contain microcode, hardwired logic, or by any combination of programmed computer components and custom hardware components.

To summarize, various embodiments of a modification to a messaging protocol, for better dealing with attachments, have been described. In the foregoing specification, the invention has been described with reference to specific exemplary embodiments thereof. It will, however, be evident that various modifications and changes may be made thereto without departing from the broader spirit and scope of the invention as set forth in the appended claims. For instance, although the AA info field has been illustrated in several example email messages as containing only information that identifies the attaching entity, this field may be used to contain additional information such as a filename for the attachment, and a time stamp (as to for example the time and/or date when the attachment was inserted into the message or when the attachment was created by its author). The specification and drawings are, accordingly, to be regarded in an illustrative rather than a restrictive sense.

What is claimed is:

1. An article of manufacture comprising:
    a computer-readable medium having stored thereon instructions that program a computer to (a) insert into a first field and a second field of a message, that is to be processed according to an electronic messaging protocol, information that identifies a sender and a recipient of the message, respectively, the message includes an attachment from an attaching entity, and (b) insert into a third field of the message, which is associated with the attachment, a unique property of the attaching entity, wherein in the message, the attachment is outside the first, second, and third fields.

2. The article of manufacture of claim 1 wherein the electronic messaging protocol is an email protocol.

3. An article of manufacture comprising:
    a computer-readable medium having stored thereon instructions that program a computer to (a) insert an attachment into a message that is to be delivered according to a messaging protocol, and (b) fill (i) a first field of the message to identify a sender, (ii) a second field of the message, which is associated with the attachment, to identify an entity who requested that the attachment be inserted, and (iii) a third field of the message to identify a recipient of the message, wherein in the message, the attachment is outside the first, second, and third fields.

4. The article of manufacture of claim 3 further comprising instructions stored in the medium that program a computer to send the message, including the attachment and filled first, second and third fields, to a message transfer agent, the agent being a node within a plurality of networks interconnected with one or more routers.

5. The article of manufacture of claim 4 wherein the insert, fill, and send operations are to be performed by one of (a) a source user agent, and (b) a client program of the sender.

6. The article of manufacture of claim 3 wherein the message is to be created as a forwarded message that includes information that identifies one or more prior senders.

7. The article of manufacture of claim 3 wherein the message is to include (i) a further attachment from a prior sender, and (ii) information that separately identifies the prior sender as a further attaching entity that inserted the further attachment.

8. An article of manufacture comprising:
    a computer-readable medium having instructions stored thereon that program a computer to (a) create a message to be delivered according to a messaging protocol for a plurality of networks interconnected with one or more routers, wherein the message includes (i) an attachment from an attaching entity, and (ii) header information that (1) identifies a sender of the message and separately (2) identifies and associates the attaching entity with the attachment, and (b) send the created message to a message transfer agent.

9. The article of manufacture of claim 8 wherein the message is to be created as a forwarded message that includes header information that identifies one or more prior senders.

10. The article of manufacture of claim 8 wherein the message is to include (i) a further attachment from a prior sender, and (ii) header information that separately identifies the prior sender as a further attaching entity that inserted the further attachment.

11. The article of manufacture of claim 8 wherein the header information identifies the attaching entity by one of (a) a name of the entity, (b) an email address of the entity, and c) where the attaching entity is a person, the initials of the person.

12. An article of manufacture comprising:
a computer-readable medium having instructions stored thereon that program a computer to process a message that is received from a client program and that is delivered in accordance with a messaging protocol for networks interconnected with one or more routers, wherein the message includes (a) an attachment, (b) a first field that identifies a sender, (c) a second field that (i) identifies an entity who requested that the attachment be inserted and (ii) is associated with the attachment, and (d) a third field that identifies a data network address of an intended recipient, wherein the message is to be processed so as to present information from the attachment and the first, second and third fields, to the intended recipient.

13. The article of manufacture of claim 12 wherein the information is to be presented by causing a window in a graphical user interface to display (i) a filename of the attachment, (ii) identification of the entity who had requested the attachment be inserted, and, separately, (iii) identification of the sender.

14. The article of manufacture of claim 13 wherein the instructions cause the identification of the entity, who had requested that the attachment be inserted, to be displayed as a mouse-over whenever a pointer in the window is positioned over a displayed filename of the attachment.

15. The article of manufacture of claim 13 wherein the instructions cause the identification of the entity that had requested that the attachment be inserted to disappear from the window when the displayed filename collapses back up.

16. The article of manufacture of claim 12 wherein the instructions cause the message to be further processed so as to present further information to the intended recipient from (i) a further attachment in the message that is from a prior sender, and (ii) a field in the message, separate from the further attachment, that identifies a further attaching entity who inserted the further attachment.

17. The article of manufacture of claim 12 wherein the instructions cause the message to be further processed so as to present further information to the intended recipient about a prior sender identified in the message.

18. An article of manufacture comprising:
a computer-readable medium having stored thereon instructions that program a computer to (a) receive a message from a client program of a subscriber to a communications service, wherein the message is to be delivered according to a messaging protocol for a plurality of networks interconnected with one or more routers, and wherein the message is to include an attachment from the subscriber, a first field that identifies a sender as the subscriber, and a destination field that identifies a data network address of an intended recipient of the message, and (b) add a second field to the message that (i) identifies an entity who requested that the attachment be inserted into the message and (ii) is associated with the attachment, wherein in the message, the attachment is outside the first, second, and destination fields.

19. The article of manufacture of claim 18 wherein the instructions are to program a server network to perform the processing and adding operations.

20. The article of manufacture of claim 18 wherein the communication service is an email service that provides email box storage for the subscriber.

21. An article of manufacture comprising:
a computer-readable medium having stored thereon instructions that program a computer to (a) process a message from a user agent, wherein the message is to be delivered according to a messaging protocol for a plurality of networks interconnected with one or more routers, and wherein the message includes an attachment, a first header field that identifies a sender, and a second header field that identifies a recipient, and (b) fill a third header field of the message, that is associated with the attachment, to identify an entity who requested that the attachment be inserted into the message.

22. The article of manufacture of claim 21 wherein the instructions are to program a mail transfer agent to perform the process and fill operations.

23. An article of manufacture comprising:
a computer-readable medium having stored thereon instructions that program a computer to (a) receive information from a header portion of a message that is processed according to a messaging protocol for a plurality of networks interconnected with one or more routers, the message includes the header portion and an attachment from an attaching entity, and wherein the received information identifies a sender of the message and, separately, identifies and associates the attaching entity with the attachment, and (b) present the received information to an intended recipient of the message.

24. The article of manufacture of claim 23 wherein the received information to be presented includes sender name, date sent, subject, and an attachment symbol, all to be displayed on a screen in one line, and wherein a unique property of the attaching entity, obtained from the received information, is to be displayed in response to the intended recipient selecting the attachment symbol.

25. The article of manufacture of claim 24 wherein the received information to be presented further includes message size, to be displayed in said one line.

26. The article of manufacture of claim 23 wherein the received information is to be presented to the intended recipient via a client email program.

27. The article of manufacture of claim 23 wherein the received information is to be presented to the intended recipient via a client Web browser interface to an email box service.

* * * * *

UNITED STATES PATENT AND TRADEMARK OFFICE
CERTIFICATE OF CORRECTION

| | | |
|---|---|---|
| PATENT NO. | : 7,689,719 B2 | Page 1 of 1 |
| APPLICATION NO. | : 12/196638 | |
| DATED | : March 30, 2010 | |
| INVENTOR(S) | : Lee | |

It is certified that error appears in the above-identified patent and that said Letters Patent is hereby corrected as shown below:

Title Pg, Item (56)

Page 2, Other Publications, under Schultz, Matthew G., line 2, delete "http://vvww.sagecertification.", insert -- http://www.sagecertification. --

Signed and Sealed this
Twenty-sixth Day of April, 2011

David J. Kappos
*Director of the United States Patent and Trademark Office*